Sept. 18, 1956     E. L. BARRETT     2,763,706
BATTERY CONSTRUCTION
Filed May 31, 1952     2 Sheets-Sheet 1
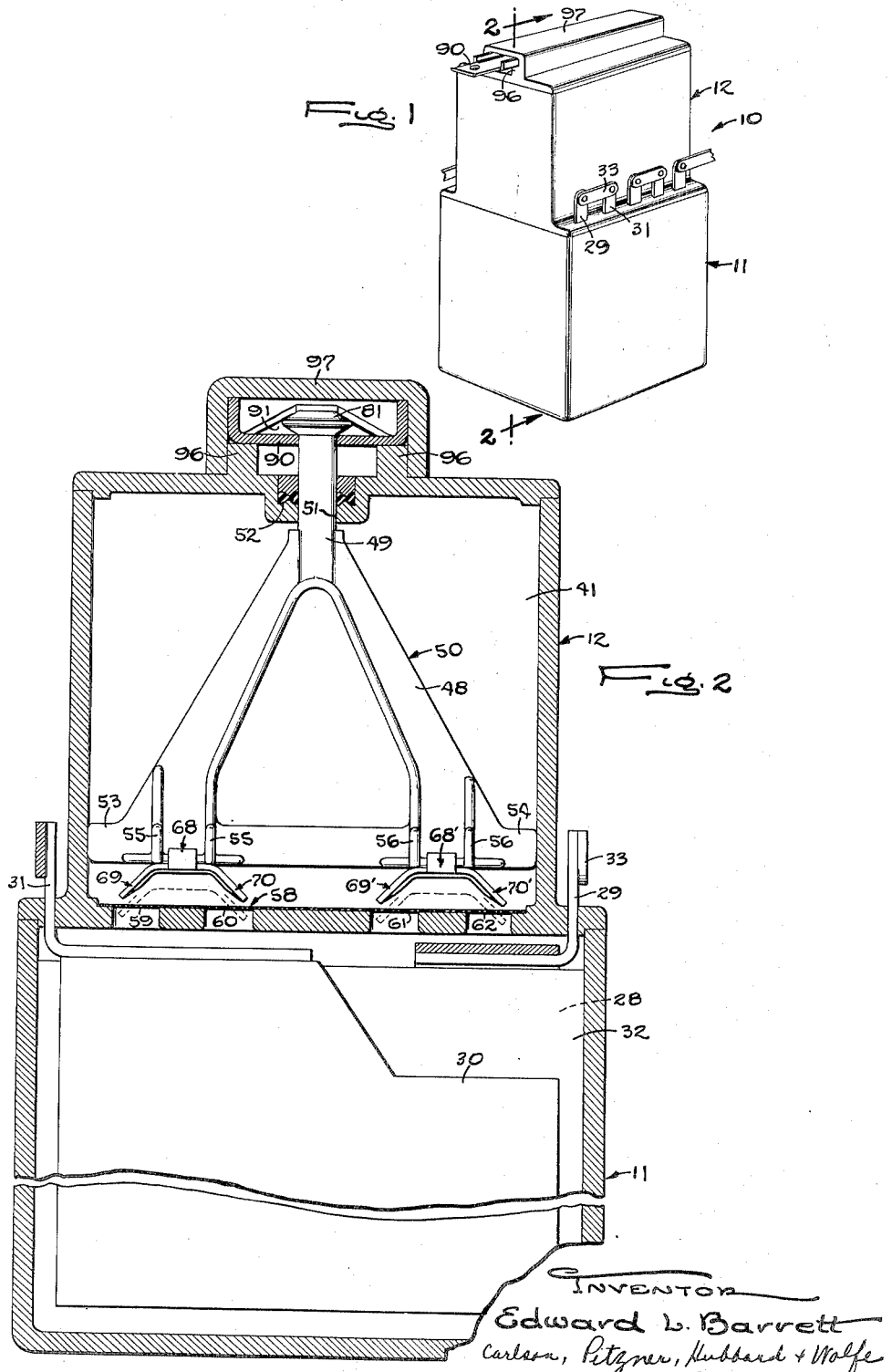
INVENTOR
Edward L. Barrett
Carlson, Pitzner, Hubbard & Wolfe
ATTORNEYS Sept. 18, 1956  E. L. BARRETT  2,763,706
BATTERY CONSTRUCTION
Filed May 31, 1952  2 Sheets-Sheet 2
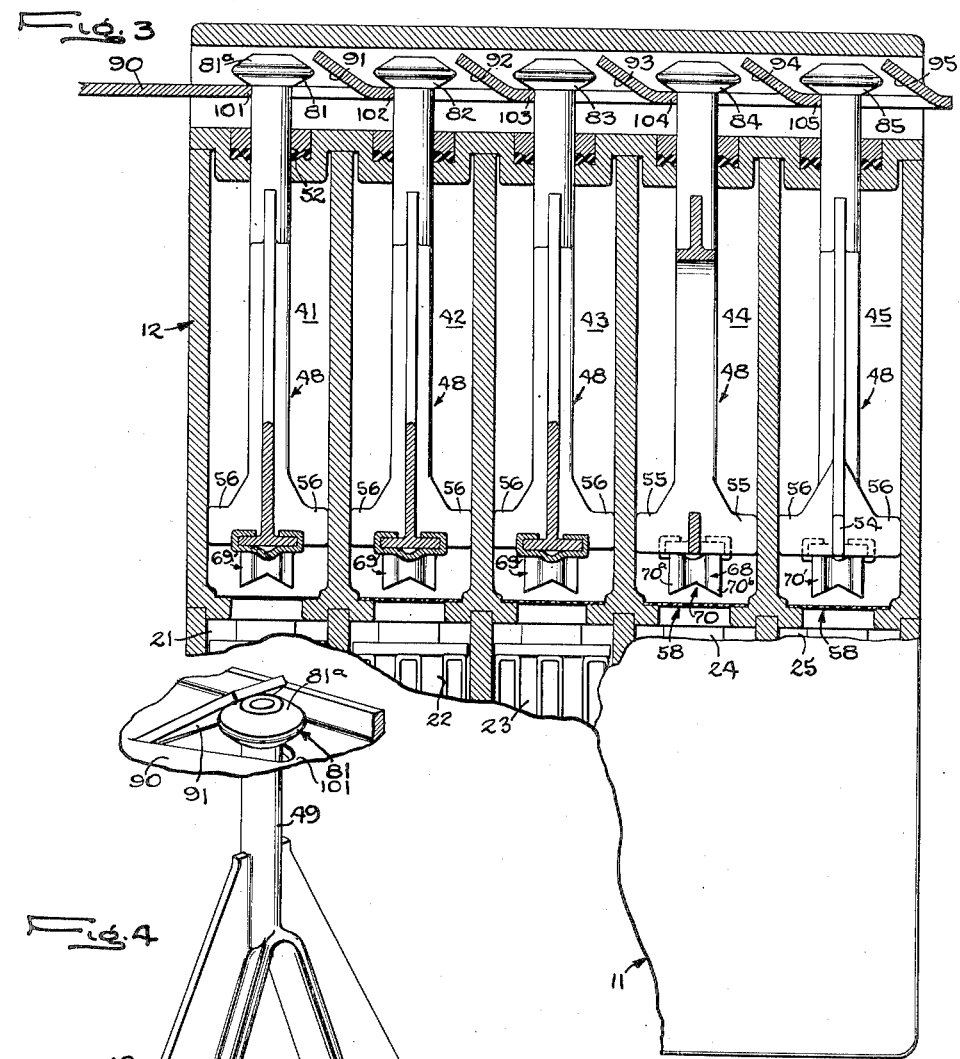
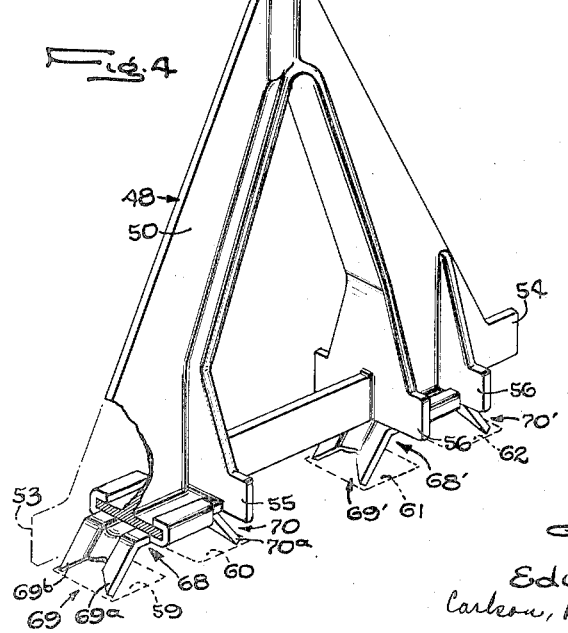
INVENTOR
Edward L. Barrett
Carlson, Pitzner, Hubbard + Wolfe
ATTORNEY

United States Patent Office 2,763,706
Patented Sept. 18, 1956

2,763,706

BATTERY CONSTRUCTION

Edward L. Barrett, La Grange, Ill.

Application May 31, 1952, Serial No. 290,933

8 Claims. (Cl. 136—90)

The present invention relates to batteries, and more particularly to high discharge batteries of the silver-zinc-alkali type. Military requirements for batteries for use in guided missiles and the like require that extremely large amounts of power be available for a period of several minutes. For example, load currents of over 100 amperes may be required from a battery having a total volume between 10 and 20 cubic inches. One of the difficulties encountered in meeting this requirement is that the batteries capable of high output current have an inherently short "wet stand" life. While improved types of plates and improved separators have been developed to increase the "wet stand" life, improvement has generally been accompanied by a correspondingly reduced output current under short-circuit conditions.

In order to reduce the amount of self-discharge, batteries have been filled with electrolyte by hypodermic syringes and the like within a few hours of the time of use. This has to be accomplished manually, often under very adverse conditions, and in the event that the battery is not used as planned, it must be thrown away.

Accordingly, it is an object to provide a battery in which self-discharge is obviated and in which full power is available at the time of use. To this end, it is an object to provide novel means for adding electrolyte to a battery of the silver-zinc-alkali type with the battery in place and without requiring that the electrolyte be manually added. It is another object to provide a battery construction in which the cells are kept absolutely dry until the time of use and in which electrolyte may be positively and quickly discharged into all of the battery cells at the same instant. It is a more detailed object to provide a battery which is positively protected against premature discharge or leakage of electrolyte even under conditions of shock and vibration.

It is still another object to provide a battery in which electrolyte is added to the cells in individual measured amounts. It is further an object to provide a battery in which the electrolyte is separately stored within the battery but which is nevertheless more compact than batteries of conventional types. Finally, it is an object to provide a battery including provision for separate storage of electrolyte which is both simple and inexpensive and which is simple to operate, discharge of electrolyte being triggered by movement of a single arming pin.

Other objects and advantages of the invention will become apparent upon reference to the following specification and the attached drawings, in which Figure 1 is a perspective view of a battery constructed in accordance with the present invention.

Fig. 2 is a section taken on lines 2—2 of Figure 1.

Fig. 3 is a side view with parts broken away corresponding to Fig. 2.

Fig. 4 is a fragmentary view showing one perforating member and its associated locking and camming element.

While only one form of the invention has been illustrated, it wil be understood that the invention is susceptible of various modifications and alternative constructions; accordingly, it will be understood that I do not intend to limit the invention to the illustrated embodiment but intend to cover all of the modifications and alternatives falling within the spirit and scope of the appended claims.

Referring now to the drawings, the battery indicated at 10 includes a lower portion 11 and an upper portion 12. The lower portion is comprised of five cells 21–25, each of which includes a set of positive and negative plates. Taking the cell 21 by way of example, the positive plates indicated at 28 have a terminal 29 and the negative plates indicated at 30 have a terminal 31. It will be understood that the plates do not per se form part of the invention. Preferably, however, the positive plates are formed of a layer of silver peroxide, while the negative plates are composed of pure zinc. The plates are separated by means of porous barriers 32 (Fig. 2).

To facilitate connecting the cells in series, the battery terminals brought out along a given side of the battery are of alternate polarity, enabling adjacent terminals to be connected by short jumpers 33, as shown in the side view (Fig. 1).

In accordance with the present invention, electrolyte is stored in individual storage cells arranged above the battery cells 21–25. These cells have been designated 41–45, inclusive. The individual cells are included in the box-like superstructure 12 and are isolated from one another by means of transverse walls or separators. In this respect, the electrolyte storage container resembles the battery casing previously described. Each of the electrolyte storage cells is provided with a rupturable bottom wall, together with means for effecting such rupture for all of the cells simultaneously.

Referring to the electrolyte storage cell 41, for example, it will be seen to include a plunger 48 having a shaft portion 49 and a body portion 50. The shaft portion is mounted for axial movement in a bore 51 at the upper end of the electrolyte storage compartment. Leakage of electrolyte at this point is prevented by means of a seal 52.

The body portion of the plunger is of flaring construction and means are provided for centering it within the cell 41. The latter is accomplished by end abutments 53, 54 and lateral abutments 55, 56. These abutments are dimensioned so as to slidably engage the inner walls of the cell and thus cause the body portion to be accurately guided when it is moved in the downward direction.

For the purpose of dividing the upper and lower portions of the battery, a barrier 58 is employed having thin-walled diaphragms 59, 60, 61, 62 for each of the cells. The diaphragms are arranged at intervals over the length of the electrolyte chamber, the diaphragms 59, 62 being located at the left and right-hand ends of the chamber 41 as shown in Fig. 2. Preferably, the barrier 58 is formed of molded polystyrene or the like. In order to rupture the diaphragms 59, 60 the plunger 48 is provided with a piercing member 68 having downwardly angled end portions 69, 70, respectively. A similar piercing member 68' is used at the other side of the plunger. The structure of the piercing member is shown in some detail in Fig. 4. Here it will be noted that the diaphragms 59, 60 are comprised of a rupturable film and have a square windowlike outline. The piercing member 68 is forked at each end to provide spaced points 69a, 69b at one end, and 70a, 70b at the other end. Each of these points is ridged, as shown, in order to increase its strength and rigidity and to insure that the diaphragms are positively pierced when the plunger is forced downwardly against them. In order that the area of the openings may be as large as possible, the points 69a, 69b are spaced so that they fall at the outer corners of the diaphragm 59. As a result, the diaphragm is sheared at its boundaries. It is found that shearing takes place much more cleanly at the boundary of the diaphragm than at the central portion thereof, because the shearing stress may be localized to a greater degree.

It is to be particularly noted that unbalanced forces are avoided in the structure described herein. Thus, it will be noted that the end portions 69, 70 are symmetrically arranged so that all lateral forces are balanced out and there is no tendency for the plunger to move laterally within the cell. Furthermore, it is to be noted that the piercing members 68, 68' are symmetrically located on opposite sides of the plunger shaft so that the only forces acting upon the shaft are in the axial direction. The plunger is also balanced in the opposite direction because of the symmetrical side-by-side arrangement of the points, for example, the points 69a, 69b, and there is no tendency for lateral binding of the plunger against the side walls of the cell. As a result of the novel plunger construction and arrangement of the piercing members, all of the downward force may be utilized in the piercing of the diaphragm and friction or binding is reduced to an absolute minimum.

Once the windowlike diaphragms are perforated, the electrolyte pours down into the battery cells. To facilitate this the plunger is ribbed as shown so as to offer little obstruction to fluid flow when in its lowered position. To further facilitate the flow of electrolyte and escape of air to the electrolyte cell, the battery may be permanently mounted in a slightly tilted position. Incidentally, it will be noted that forming the piercing members in two parts, 68 and 68', removes any possibility of short circuit between the two sets of plates.

To lower the plungers simultaneously, each of the plungers is brought out to a cam follower at the top of the battery. These cam followers have been designated 81–85, respectively. Again taking the first cell 41 by way of example, it will be noted that the cam follower 81 has a cam surface 81a arranged at an angle with respect to axis of the plunger. In carrying out the present invention, the cam follower 81 is preferably in the form of a symmetrically-formed button having an upper conical surface and a lower conical surface. As a result of using a conical surface, the cam follower is properly oriented for contact with the cam in all of its positions and no care need be exercised when this portion of the device is assembled.

For acting upon all of the cam followers 81–85 simultaneously, an arming pin 90 is used having cam surfaces 91–95, respectively. The arming pin is preferably constructed in the form of a slide having a channeled cross section as shown in Figs. 1 and 2. Ridges 96 are provided as bearing surfaces for the arming pin 90, and an enclosing guide member 97 running the length of the battery serves both to protect the arming pin and to guide it for endwise sliding movement. Preferably, the cam surfaces 91–95 consist of inclined tab projections which are formed integrally in the side of the pin. It will be apparent in Fig. 3 that upon moving the arming pin to the left, the cam followers 81–85 are engaged simultaneously. This forces the cams and associated plungers downwardly to rupture the diaphragms and permits electrolyte to pour into the battery cell arranged immediately below. Premature movement of the plungers is prevented by providing shoulders 101–105 on the arming pin. With the pin in its normal position, such shoulders engage the underside of each of the cam followers, and therefore serve as a positive lock against axial movement, even in the presence of shock and vibration. However, since the underside of each of the cam followers has a tapered, conical surface, clearance is provided during intentional thrust of the plungers.

The advantages of the above arrangement will be apparent to one skilled in the art. The electrolyte is completely isolated from the battery cells. Since the diaphragms are formed integrally in the barrier 58, cemented joints between the electrolyte and the battery cell and the attendant possibilities of leakage are eliminated. Because of the drumhead construction of the diaphragms, no reasonable amount of shock or vibration can cause them to rupture and thereby discharge the electrolyte prematurely. Finally, the plungers are all locked securely in place by the arming pin until the pin is pulled.

Upon pulling the arming pin the plungers are all thrust downwardly at the same time with a minimum of friction and with no tendency toward binding. Because of the construction of the piercing members, even a relatively small amount of movement produces a large opening for the electrolyte to pour into the battery cell. Dependence is not placed upon a single piercing point, instead, eight points and four openings in each cell act to produce an opening for the electrolyte. In a battery of the type described above, the force required to move the arming pin is relatively small and such movement may be accomplished either manually or by low-powered servo actuators.

The battery which has been described is capable of being armed even though the missile in which it is mounted is rolled to a sharp angle in either direction. Thus, it will be noted that the diaphragms 59 and 62 occupy opposite corners of the electrolyte storage cell and permit electrolyte to be discharged even though the battery may be lying on one side or the other. Using the batteries of the foregoing design, "wet stand" life is no longer a factor and filling problems are avoided. The batteries may be permanently mounted within the missile and arming of the battery may be deferred until the final check is made just prior to firing the missile. In the event that it is necessary to transport a missile long distances by air, the batteries may remain dry until just before the missile is launched. This makes it unnecessary to load the missiles in such a way as to provide access by the technicians. Assuming that each of the upper chambers has been properly charged, operating the arming pin 90 causes the desired amount of electrolyte to flow downwardly into each of the individual battery cells so that the cells may operate with maximum efficiency. The possibility of skipping a cell or of inadequate filling due to human error under the conditions of stress which may accompany use of the guided missiles is thereby avoided.

I claim as my invention:

1. A high discharge battery comprising, in combination, a lower casing having a plurality of cells therein arranged side by side, terminals projecting upwardly from said cells at the opposite ends of each of them and arranged in rows along the opposite edges of said casing, an electrolyte storage casing having a plurality of electrolyte storage chambers arranged immediately above the cells of the battery, and means including a barrier in each of said storage chambers for normally isolating the electrolyte and for permitting it to flow into the associated cell just prior to discharging the battery, said upper casing having a set-back along its sides for providing access to said rows of terminals.

2. In a battery of the high discharge type, a plurality of cells arranged side by side, a plurality of electrolyte chambers arranged adjacent each of the cells respectively, plungers extending into each of said chambers for discharging electrolyte into the associated cells, an inclined cam surface on the outer end of each of said plungers, an arming pin having cam surfaces thereon registering with the cam surfaces on said plungers, interfering shoulders on said arming pin and said plungers respectively for preventing inward movement of the plungers when the arming pin is in retracted position, and means for mounting said arming pin so that upon movement of the latter from said retracted position the shoulders are disengaged and the cam surfaces are engaged with resulting movement of all of said plungers so that the electrolyte is added to all of said cells substantially simultaneously.

3. In a battery of the high discharge type, a plurality of cells arranged side by side, a plurality of electrolyte chambers arranged adjacent each of the cells respectively, plungers extending into each of said chambers for discharging electrolyte into the associated cells, the outer portions of each of said plungers being arranged in alinement with one another, conical end surfaces on the outer ends respectively of said plungers, an arming pin having cam surfaces arranged in a row thereon for registering with the conical end surfaces on said plungers, and means for mounting said arming pin so that upon movement of the latter the conical end surfaces are cammingly engaged with resulting movement of all of said plungers so that the electrolyte is added to all of said cells substantially simultaneously.

4. A battery of the high discharge type having a normally short "wet stand" life comprising, in combination, a lower casing having a plurality of battery cells arranged side by side, an upper casing having a plurality of electrolyte storage chambers arranged side by side above the respective battery cells, barriers having rupturable windows between adjacent battery cells and electrolyte storage chambers, axially movable plungers mounted in each of said cells, said plungers having piercing members alined with said rupturable windows for piercing the same upon depression of said plungers, said plungers being dimensioned for sliding engagement at their lower ends with the opposite walls of the respective electrolyte storage chamber for guiding said piercing members into accurate engagement with said rupturable windows.

5. In a battery of the high discharge type having a normally short "wet stand" life, the combination comprising a battery cell, an electrolyte storage chamber arranged adjacent thereto, a barrier between said cell and said electrolyte storage chamber for normally isolating electrolyte in said chamber, a plunger having a shaft portion extending through the end wall of said storage chamber for guiding the plunger for movement toward and away from said barrier, said barrier having a pair of rupturable diaphragms spaced from one another, said plunger having spaced piercing members thereon in register with said diaphragms, said piercing members presenting downwardly angled points for engagement with said diaphragms and being symmetrically arranged so as to produce balanced lateral forces when the piercing members are simultaneously advanced into said diaphragms by said plunger.

6. In a battery of the high discharge type having a normally short "wet stand" life, the combination comprising a battery cell, an electrolyte storage chamber arranged adjacent thereto, a barrier between said cell and said electrolyte storage chamber for normally isolating electrolyte in said chamber, a plunger having a shaft portion extending through the end wall of said storage chamber opposite said cell for guiding the plunger for movement toward and away from said barrier, said barrier being of substantial thickness but providing a sharply defined windowlike area over which the thickness is substantially reduced to form a rupturable diaphragm, said plunger having a piercing member downwardly inclined therefrom, said piercing member having a sharp leading edge and having lateral edges which are generally alined with the edges of said diaphragm so that the diaphragm is progressively ruptured at its boundaries with a shearing action upon inward movement of said plunger.

7. In a high discharge battery having a normally short "wet-stand" life, the combination comprising a battery casing having transverse vertical walls defining a plurality of cells arranged flatly side by side and with the ends of the respective cells coinciding with the side walls of the battery, means providing a plurality of electrolyte chambers positioned above respective ones of said cells and having ends generally coinciding with the ends of said battery cells, barriers between said cells and said chambers, said barriers having rupturable diaphragms spaced from one another and respectively located at the ends of said chambers, means including two piercing elements in each of said electrolyte chambers for simultaneously piercing open the rupturable diaphragms at the opposite ends thereof to insure substantially complete discharge of electrolyte into the respective cells when the battery is in laterally tilted position, each of said electrolyte chambers having a plunger guidably mounted in the top wall thereof for mounting the two piercing elements and symmetrically arranged between them for application of balanced forces thereto.

8. In a battery of the high discharge type, the combination comprising a battery cell, means defining an electrolyte storage chamber arranged immediately above said cell and separated therefrom by a common barrier, said electrolyte storage chamber being of rectangular cross section and having opposed parallel side walls and opposed parallel end walls, the latter substantially coinciding with the ends of the battery cell, a plunger in said storage chamber arranged for movement toward and away from said barrier, said barrier having a pair of rupturable diaphragms adjacent the respective end walls of the chamber, means including a pair of piercing members at the end of said plunger and poised above the rupturable diaphragms in said barrier for piercing the same, said plunger being of ribbed construction and having guide portions extending outwardly therefrom for slidably engaging the walls of said chamber, thereby insuring positive alinement between said piercing member and the rupturable diaphragms in said barrier, said plunger having shaft means centrally mounted thereon and extending upwardly for slidable reception in the top wall of said chamber, and means for imparting downward movement to said shaft means.

References Cited in the file of this patent

UNITED STATES PATENTS

| | | |
|---|---|---|
| 1,218,847 | Firey | Mar. 13, 1917 |
| 1,417,692 | Rosen | May 30, 1922 |